United States Patent
Itoh et al.

(10) Patent No.: US 8,884,564 B2
(45) Date of Patent: Nov. 11, 2014

(54) VOLTAGE CONVERTER AND VOLTAGE CONVERTER SYSTEM INCLUDING VOLTAGE CONVERTER

(75) Inventors: Takeshi Itoh, Nagoya (JP); Hirofumi Kako, Aichi-ken (JP)

(73) Assignee: Denso Corporation, Kariya (JP)

( * ) Notice: Subject to any disclaimer, the term of this patent is extended or adjusted under 35 U.S.C. 154(b) by 295 days.

(21) Appl. No.: 13/416,196

(22) Filed: Mar. 9, 2012

(65) Prior Publication Data

US 2012/0229061 A1 Sep. 13, 2012

(30) Foreign Application Priority Data

Mar. 11, 2011 (JP) ................................. 2011-053959
Mar. 11, 2011 (JP) ................................. 2011-053960
Dec. 27, 2011 (JP) ................................. 2011-286680

(51) Int. Cl.
*H02P 27/00* (2006.01)
*B60L 15/20* (2006.01)
*H02M 3/158* (2006.01)
*B60L 3/00* (2006.01)
*B60L 11/18* (2006.01)

(52) U.S. Cl.
CPC .......... *H02M 3/1584* (2013.01); *Y02T 10/7241* (2013.01); *Y02T 10/642* (2013.01); *B60L 2240/525* (2013.01); *B60L 15/20* (2013.01); *B60L 2210/40* (2013.01); *B60L 2240/421* (2013.01); *Y02T 10/7005* (2013.01); *B60L 2240/527* (2013.01); *B60L 2220/14* (2013.01); *B60L 3/003* (2013.01); *B60L 2210/30* (2013.01); *B60L 2240/423* (2013.01); *B60L 11/1803* (2013.01); *Y02T 10/7011* (2013.01)
USPC .................... 318/400.3; 318/453; 318/400.33

(58) Field of Classification Search
USPC .................... 318/400.3, 453, 400.33, 400.02, 318/400.04, 400.15, 400.26, 803, 441; 363/50
See application file for complete search history.

(56) References Cited

U.S. PATENT DOCUMENTS

2012/0088172 A1* 4/2012 Kaneko et al. ................. 429/429

FOREIGN PATENT DOCUMENTS

JP 2000-41381 2/2000
JP 2004-357388 12/2004

(Continued)

OTHER PUBLICATIONS

Office Action (2 pages) dated Oct. 15, 2013, issued in corresponding Japanese Application No. 2011-286680 and English translation (2 pages).

(Continued)

*Primary Examiner* — Karen Masih
(74) *Attorney, Agent, or Firm* — Nixon & Vanderhye PC

(57) ABSTRACT

A voltage converter includes a first circuit and a second circuit. The first circuit includes two or more reactors and at least one switching element. One terminal of each of the reactors is connected in parallel with respect to a power source. The at least one switching element is connected to the other terminal of each of the reactors. The second circuit includes at least one rectifier of which one terminal is connected to the electrical load. The second circuit shares with the first circuit the at least one switching element connected to the at least one rectifier. The first circuit is connected such that the power source charges the respective reactors when the at least one switching element is turned ON. The second circuit is connected such that the reactors discharge power to the electrical load when the at least one switching element is turned OFF.

11 Claims, 6 Drawing Sheets

(56) References Cited

FOREIGN PATENT DOCUMENTS

| | | |
|---|---|---|
| JP | 2010-104139 | 5/2010 |
| JP | 2010-268826 | 11/2010 |
| JP | P2010-268626 A | 11/2010 |

OTHER PUBLICATIONS

Office Action (2 pages) dated Apr. 1, 2014, issued in corresponding Japanese Application No. 2011-286680 and English translation (2 pages).

* cited by examiner $$\text{DUTY RATIO } D = \frac{Pd}{Pc}$$

$$fc = \frac{1}{Pc} > fin$$

$$20\text{Hz} < fc \leq 20\text{kHz}$$

$$f_{LC} = \frac{D}{2\pi\sqrt{LC}} \; [\text{Hz}] \cdots \text{F1}$$

$$\zeta = \frac{RB}{2 \cdot D}\sqrt{\frac{C}{L}} \quad \cdots \text{F2}$$

VOLTAGE CONVERTER AND VOLTAGE CONVERTER SYSTEM INCLUDING VOLTAGE CONVERTER

CROSS REFERENCE TO RELATED APPLICATION

This application is based on and claims the benefit of priority from earlier Japanese Patent Application Nos. 2011-53959, 2011-53960 and 2011-286680 filed on Mar. 11, 2011, Mar. 11, 2011 and Dec. 27, 2011 respectively, the descriptions of which are incorporated herein by reference.

BACKGROUND

1. Technical Field

The present application relates to a voltage converter and a power supply system including the voltage converter. In particular, the present application relates to technology for converting the voltage of direct-current voltage supplied from a battery and using the converted voltage to drive an electric vehicle.

2. Description of the Related Art

As a power supply device for electric vehicles, a power supply device is widely used that increases the voltage of a direct-current power supply, such as a battery, using a boost circuit and supplies a high voltage that is higher than the battery voltage to a drive section of an electric vehicle. The boost circuit has a reactor, a capacitor, a switching element, and a diode. For example, in a power supply device disclosed in JP-A-2010-268626, a boost circuit has a reactor and a capacitor and, therefore, has a resonant frequency. On the other hand, with the increased voltage as the direct-current power supply voltage of an inverter, the drive section of an electric vehicle converts the direct current to a three-phase alternating current in the inverter and supplies power to an alternating-current motor. The alternating-current motor is known to cause periodic voltage fluctuations in the direct-current power supply voltage of the inverter. The voltage fluctuations are attributed to, for example, detection errors in measurement devices (current sensors and rotation angle sensors). When the periodic voltage fluctuations in the drive section match the resonant frequency of the boost circuit, excessive voltage may be applied to the switching element in the boost circuit. The switching element may be destroyed. JP-A-2010-268626 discloses a method in which destruction of the switching element is prevented by reducing a boost voltage command value when the frequency of the voltage fluctuation in the drive section approaches the resonant frequency of the boost circuit.

However, in the conventional technology, the inverter power supply voltage is reduced when the frequency of the voltage fluctuation in the drive section approaches the resonant frequency of the boost circuit. Therefore, an issue arises in that, although limited, reduced vehicle driving force is unavoidable.

SUMMARY

An embodiment provides a voltage converter and a voltage converter system in which voltage of the direct-current power supply of the inverter circuit is stabilized even in an operating region where the voltage converter and the alternating-current motor may resonate.

As a first aspect, a voltage converter converts the voltage of direct-current (DC) power supplied from a direct-current power supply and applies a converted voltage to an electrical load. The voltage converter includes a first circuit and a second circuit. The first circuit includes N (N being an integer of 2 or more) reactors and at least one switching element. One terminal of each of the N reactors is connected in parallel with respect to the direct-current power supply (i.e., power source). The at least one switching element is connected to the other terminal of each of the N reactors. The second circuit includes at least one rectifier of which one terminal is connected to the electrical load. The second circuit shares with the first circuit the at least one switching element connected to the other terminal of the at least one rectifier. The first circuit is connected such that the direct-current power supply charges the N reactors when the at least one switching element is turned ON. The second circuit is connected such that the N reactors discharge power to the electrical load when the at least one switching element is turned OFF.

In the above-described application, the combined inductance of the reactors can be reduced while maintaining output power. Therefore, resonant frequency fLC can be heightened, thereby separating the resonant frequency of the voltage converter from the frequency of voltage fluctuation in the electrical load. Damping ratio can also be increased. As a result, resonance phenomenon in the voltage converter attributed to voltage fluctuations in the electrical load can be suppressed.

In the present voltage converter, all that is required is that the respective polarities of the elements are connected to one another in a direction configuring a charge circuit (first circuit) and a discharge circuit (second circuit). The charge circuit is connected such that the direct-current power supply charges the reactor when the switching element is turned ON. The discharge circuit is connected such that the reactor discharges power to the electrical load when the switching element is turned OFF.

As a second aspect, the at least one switching element includes an N switching elements. The at least one rectifier includes an N rectifiers. The first circuit is connected such that the direct-current power supply supplies power to each reactor connected to each of the N switching elements, when each of the N switching elements is turned ON. The second circuit is connected such that each reactor connected to each of the N switching elements supplies power to the electrical load when the N switching elements are turned OFF.

In the above-described application, each reactor can be independently driven. As a result, power can be supplied, for example, to the N reactors with the respective phases shifted from one another. Therefore, a ripple in the output power can be reduced by the timing of peak current of each voltage converter unit being shifted. As a result, easing of required specifications related to ripple of the smoothing capacitor and reduction in magnetic noise generated by the reactors, the smoothing capacitor, and the direct-current power supply can be obtained. Furthermore, an operation can be performed in which charge and discharge of some of the reactors is stopped when output power is small. As a result, reduction in efficiency during low output can be avoided.

As a third aspect, the voltage converter converts the voltage of direct-current power supplied from a direct-current power supply and applies a converted voltage to an electrical load. The voltage converter includes an N-number (N being an integer of 2 or more) of voltage converter units connected to one another in parallel between the direct-current power supply and the electrical load. The voltage converter unit includes a first circuit and a second circuit. The first circuit includes a reactor and a switching element. One terminal of the reactor is connected to the direct-current power supply. The switching element is connected to the other terminal of the reactor. The second circuit includes a rectifier of which one terminal is connected to the electrical load. The second circuit shares with the first circuit the switching element connected to the other terminal of the rectifier. The first circuit is connected such that the direct-current power supply charges the reactor when the switching element is turned ON. The second circuit is connected such that the reactor discharges power to the electrical load when the switching element is turned OFF. In the above-described application, a voltage converter can be easily designed, for example, by the voltage converter units being combined. The voltage converter unit serves as a minimum element prepared in advance. As a result, the necessity for newly developing a reactor in accompaniment with changes in current capacity, particularly increase in current capacity, can be suppressed. Increase in current capacity causes issues particularly in thermal design when a reactor is newly developed.

In the thermal design of the reactor, design flexibility in which the shape of the wire of the coil is thickened to reduce copper loss that causes heat generation and design flexibility in which the surface area is increased to enhance heat-discharging effects are generally used. However, the inventors of the present application have found that, regardless of which design flexibility is used, an area in which volume nonlinearly (suddenly) increases is present in designing the reactor, hampering power boost of the power supply device. In this way, excessive increase in volume of the reactor accompanying increased output of the power converter circuit can be prevented.

As a fourth aspect, the voltage converter according to the second aspect includes a first circuit and a second circuit. The first circuit includes N switching elements and N rectifiers connected in parallel each other, and the second circuit includes N rectifiers and N switching elements connected in parallel each other. A dead-time is set between the switching elements of the first circuit and the switching elements of the second circuit to prevent simultaneous switching. The switching elements of the second circuit are turned OFF when the switching elements included in the first circuit are turned ON. The switching elements of the second circuit are turned ON when the switching elements included in the first circuit are turned OFF. Power supply from the direct-current power supply to the electrical load and power supply from the electrical load to the direct-current power supply are both provided.

In the above-described application, a function is provided in which the direct-current power supply supplies power to the electrical load when the electrical load consumes power, and generated power from the electrical load is supplied to the direct-current power supply when the electrical load generates power. In addition, each reactor can be driven independently. As a result, power can be supplied, for example, to the N reactors with the respective phases shifted from one another. Therefore, a ripple in the output power can be reduced by the timing of peak current of each voltage converter unit being shifted. As a result, easing of required specifications related to ripple of the smoothing capacitor and reduction in magnetic noise generated by the reactors, the smoothing capacitor, and the direct-current power supply can be actualized. Furthermore, an operation can be performed in which charge and discharge of some of the reactors is stopped when output power is small. As a result, reduction in efficiency during low output can be avoided.

As a fifth aspect, the voltage converter according to the third aspect includes an N-number (N being an integer of 2 or more) of voltage converter units connected to one another in parallel between the direct-current power supply and the electrical load. The voltage converter unit includes a first circuit and a second circuit. The first circuit includes a reactor, a switching element, and a rectifier. One terminal of the reactor is connected to the direct-current power supply. The switching element is connected to the other terminal of the reactor. The rectifier is connected in parallel with the switching element. The second circuit includes a rectifier of which one terminal is connected to the electrical load. The second circuit shares with the first circuit the switching element connected to the other terminal of the rectifier. The second circuit includes a rectifier connected in parallel with the shared switching element. A dead-time is set between the switching element of the first circuit and the switching element of the second circuit. The switching element included in the second circuit is turned OFF when the switching element included in the first circuit is turned ON. The switching element included in the second circuit is turned ON when the switching element included in the first circuit is turned OFF. The power converter circuit provides both power supply from the direct-current power supply to the electrical load and power supply from the electrical load to the direct-current power supply. In the above-described application, a voltage converter can be easily designed, for example, by the voltage converter units being combined. The voltage converter unit serves as a minimum element prepared in advance. In addition, the voltage converter unit supports power supply in both directions, from the direct-current power supply to the electrical load, and from the electrical load to the direct-current power supply. As a result, the necessity for newly developing a reactor in accompaniment with changes in current capacity and changes in current direction, particularly increase in current capacity, can be suppressed. Increase in current capacity causes issues particularly in thermal design when a reactor is newly developed.

As a sixth aspect, a voltage converter system including a voltage converter according to any one of the above-described second to fifth aspects and a control section that controls the voltage converter is provided. The control section drives the N switching elements at differing phases.

In the above-described application, power can be supplied to the N reactors with the respective phases shifted from one another. Therefore, the combined ripple flowing to the direct-current power supply and the smoothing capacitor can be reduced by the timing of peak current flowing to each reactor being shifted. As a result, easing of specifications related to ripple of the smoothing capacitor and reduction in magnetic noise generated by the reactors, the smoothing capacitor, and the direct-current power supply can be actualized.

As a seventh aspect, the electrical load is an alternating-current motor system including a traction motor of a vehicle and a direct current-to-alternating current converter circuit for driving the traction motor.

In the above-described application, standardization of mounting methods and constituent components, and the like can be favorably applied to electric automobiles and hybrid automobiles in which the voltage converter handles large power.

As an eighth aspect, in the voltage converter system, a frequency value where the switching frequency of the switching element included in the voltage converter is multiplied by the number of reactors connected in parallel is set to exceed audible frequency range.

In the above-described application, the ripple frequency of the current flowing to the direct-current power supply that handles the largest amount of power in the voltage converter can be increased to a frequency exceeding the audible frequency range. Therefore, generation of magnetic noise from the direct-current power supply can be suppressed.

BRIEF DESCRIPTION OF THE DRAWINGS

In the accompanying drawings:

FIG. 9 is a time chart of control details of the voltage converter 10a.

DETAILED DESCRIPTION OF THE PREFERRED EMBODIMENTS

An embodiment applied to a power supply device 50 that supplies power to a drive device of a vehicle of the present application will hereinafter be described with reference to the drawings.

Figure 1:
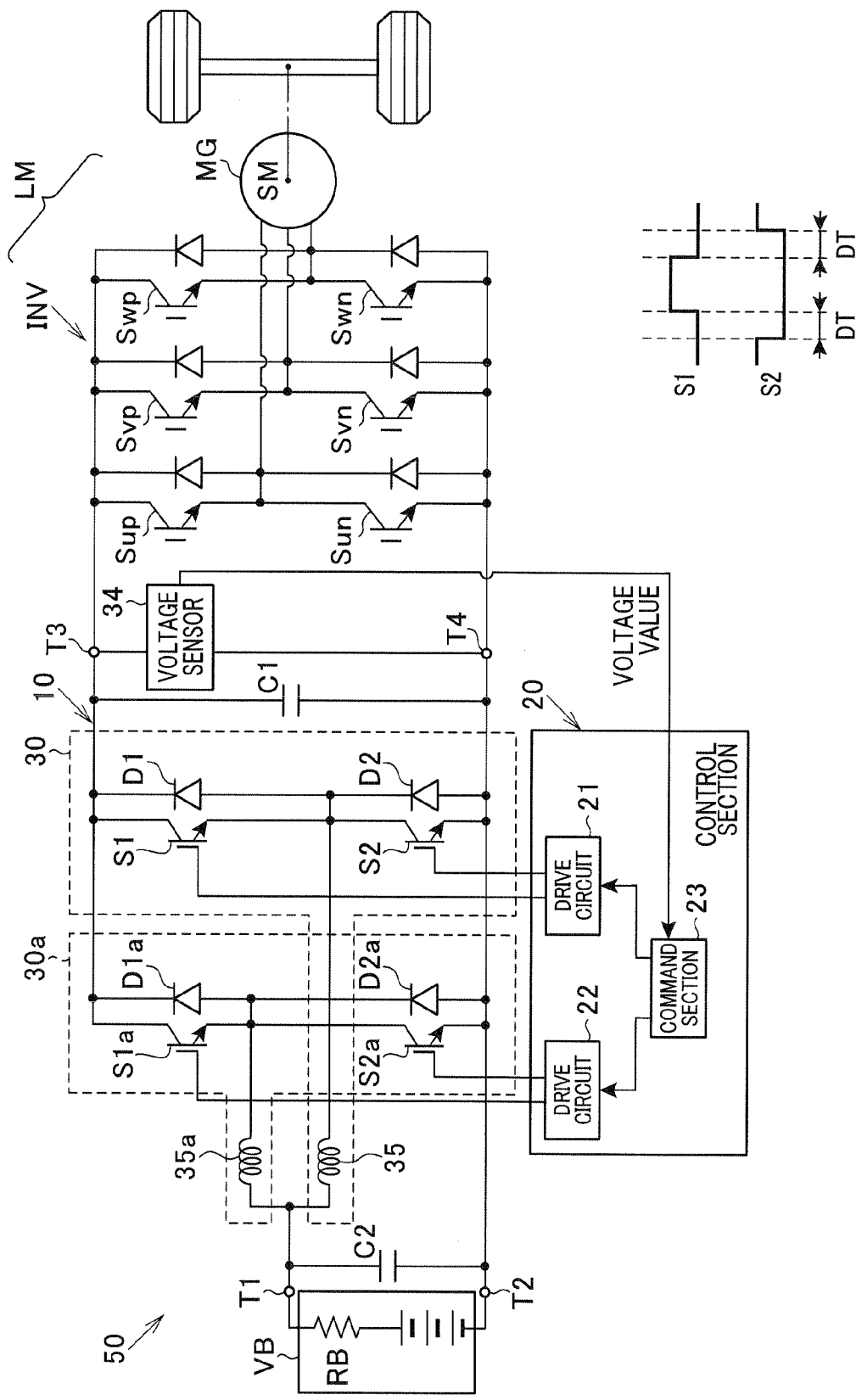
FIG. 1 is a system configuration diagram of a configuration of a power supply device 50 according to an embodiment.

FIG. 1 is a system configuration diagram of a configuration of the power supply device 50 according to the embodiment. The power supply device 50 supplies direct current power, i.e., DC power, to a electrical load LM that is a drive device (a three-phase alternating-current (AC) motor system, described hereafter) of a vehicle. The power supply device 50 includes a direct-current (DC) battery VB, a voltage converter 10, and a control section 20. The voltage converter 10 provides a voltage boosting function and a voltage reducing (step-down) function. In the voltage boosting function, the voltage converter 10 increases the voltage of the direct-current power supplied from the DC battery VB and applies the electrical load LM with the boosted voltage (power). In the voltage step-down function, the voltage converter 10 reduces the voltage of regenerative power generated in the electrical load LM to be stepped down and charges the DC battery VB with the step-down voltage. According to the embodiment, the DC battery VB is a lithium ion battery having an internal resistance RB. The lithium ion battery is characteristic in that, when the direct-current power supply voltage of the lithium-ion battery is made equal to that of, for example, a nickel-metal-hydride secondary battery, the internal resistance decreases to about almost half that of the nickel-metal-hydride secondary battery. The combination of the voltage converter 10 and the control section 20 is also referred to as a voltage converter system. The DC battery VB is also referred to as a power source.

The voltage converter 10 includes input-side terminals T1 and T2, output-side terminals T3 and T4, a smoothing capacitor C1, a filter capacitor C2, and two voltage converter units 30 and 30a. The input-side terminals T1 and T2 are used to connect the voltage converter 10 to the DC battery VB. The output-side terminals T3 and T4 are used to connect the voltage converter 10 to the electrical load LM. The voltage converter units 30 and 30a have the same configuration. The positive terminal of the DC battery VB is connected to the input-side terminal T1. The negative terminal of the DC battery VB is connected to the input-side terminal T2. The positive terminal of the electrical load LM is connected to the output-side terminal T3. The negative terminal of the electrical load LM is connected to the output-side terminal T4. The two voltage converter units 30 and 30a are mutually connected in parallel with respect to the DC battery VB and the electrical load LM (i.e., connected in parallel between the DC battery VB and the electrical load LM).

The control section 20 includes a command section 23, a drive circuit 21, a drive circuit 22, and a voltage sensor 34. The drive circuit 21 drives the voltage converter unit 30. The drive circuit 22 drives the voltage converter unit 30a. The voltage sensor 34 measures a potential difference VH between the output-side terminal T3 and the output-side terminal T4. The command section 23 outputs pulse-width modulation (PWM) signals to the two drive circuits 21 and 22. The command section 23 performs feedback control based on the measurement value of potential difference between the output-side terminals T3 and T4 measured by the voltage sensor 34.

The filter capacitor C2 is connected between the input-side terminal T1 and the input-side terminal T2. The filter capacitor C2 is also connected in parallel with the DC battery VB. The filter capacitor C2 serves to smooth the input voltage of the voltage converter 10. On the other hand, the smoothing capacitor C1 is connected between the output-side terminal T3 and the output-side terminal T4. The smoothing capacitor C1 is also connected in parallel with the electrical load LM. The smoothing capacitor C1 provides a function of smoothing ripple voltage of the output voltage of the voltage converter unit 30 and a function as an output-power buffer.

The voltage converter unit 30 includes two switching elements S1 and S2, two diodes D1 and D2, and a reactor 35. The switching elements S1 and S2 provide a switching function. The diodes D1 and D2 provide a rectification function. The reactor 35 provides a function of storing electrical energy and a function of discharging electrical energy. According to the embodiment, insulated gate bipolar transistors (IGBTs) are used as the switching elements S1 and S2. However, other elements may also be used. The reactor 35 can be configured by, for example, a cylindrical coil (not shown) and a core (not shown) covering the coil. The coil generates magnetic flux as a result of energization. The core is composed of a resin mixed with magnetic powder. The two diodes D1 and D2 are also referred to as rectifiers.

The elements of the voltage converter unit 30 are connected in the following manner. One end of the reactor 35 is connected to the emitter of the switching element S1, the collector of the switching element S2, the anode of the diode D1, and the cathode of the diode D2. The cathode of the diode D1 is connected to the collector of the switching element S1. The anode of the diode D2 is connected to the emitter of the switching element S2. The voltage converter unit 30a includes two switching elements S1a and S2a and two diodes D1a and D2a that are connected in a similar manner.

The voltage converter unit 30 is connected to the input- and output-side terminals T1 to T4 in the following manner. The voltage converter unit 30 is connected to the input-side terminal T1 by the other end of the reactor 35, and to the input-side terminal T2 (output-side terminal T4) by the emitter of the switching element S2 and the anode of the diode D2. On the other hand, the voltage converter unit 30 is connected to the output-side terminal T3 by the collector of the switching element S1 and the cathode of the diode D1, and to the output-side terminal T4 (input-side terminal T2) by the emitter of the switching element S2 and the anode of the diode D2. The input-side terminal T2 is connected to the output-side terminal T4.

On the other hand, the voltage converter unit 30a is connected to the input- and output-side terminals T1 to T4 in parallel with the voltage converter unit 30. As a result, the two voltage converter units 30 and 30a can be driven independently from each other. In other words, the voltage converter units 30 and 30a can be driven at phases differing from each other. In addition, control, such as stopping either of the voltage converter units 30 and 30a during low output, can be performed.

The voltage converter unit 30 includes the switching element S2 and the diode D1 used to actualize a power supply function of supplying power to the electrical load LM (boost converter), and the switching element S1 and the diode D2 used to actualize a regeneration function of regenerating the DC battery VB (step-down converter).

The electrical load LM is a known three-phase alternating-current motor system configured by an alternating-current motor (motor-generator MG) and a direct current-to-alternating current (DC/AC) converter circuit (inverter INV). The motor-generator MG serves as a traction motor of the vehicle. The inverter INV is used to perform DC/AC conversion on the direct-current voltage between the output-side terminals T4 and T3 (smoothing capacitor C1) and drives the motor-generator MG. The direct-current voltage between the output-side terminals T4 and T3 is the DC battery VB voltage that has been boosted by the voltage converter unit 30. A synchronous machine is given as an example of the motor-generator MG. A circuit composed of six switching elements S&# (&=u, v, w; #=p, n) is given as an example of the inverter INV. An example of a control device that controls the three-phase alternating-current motor system is omitted (not shown).

Figure 2:
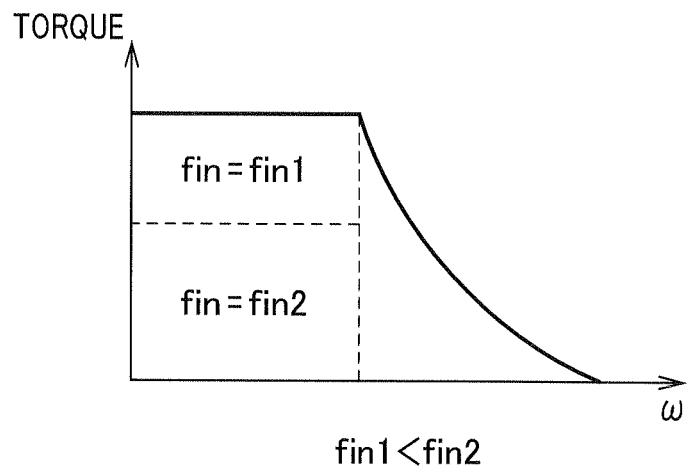
FIG. 2 is a diagram of an operating range of a motor-generator.

FIG. 2 is a conceptual diagram for explaining driving of the motor-generator MG and the inverter INV. As shown in FIG. 2, the motor-generator MG is driven by the inverter INV within an operating range determined by torque and rotation speed. In a comparatively low-rotation range, the operating range is characteristic in that it is set to a constant value with the torque, determined by the driving force specification of the vehicle, as the upper limit. In addition, in FIG. 2, a switching frequency fin of the inverter INV in the comparatively low-rotation range is schematically shown. In this range, a value fin1 of the switching frequency fin in a high-torque range is set lower than a value fin2 of the switching frequency fin in the low-torque range. The purpose of this setting is to reduce switching loss per unit time in the high-torque range.

The switching frequency is determined by a control device (not shown). For example, operation signals of the switching elements S&# configuring the inverter INV can be determined based on carrier frequency, by triangular-wave comparison PWM processing being performed on a three-phase alternating current command voltage calculated by known current feedback control. The known current feedback control may be that in which a two-phase or three-phase motor current flowing to the motor-generator MG is detected, and the position of the magnetic pole of the motor-generator MG is detected. Based on d-q control theory, current command and the motor current are tracked.

Figure 3:
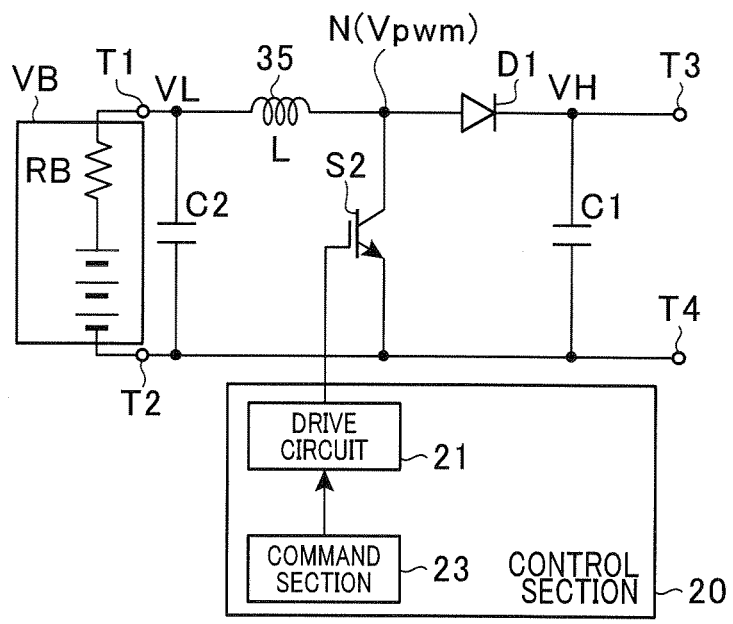
FIG. 3 is a conceptual diagram for explaining a voltage boosting function of a voltage converter unit 30.

FIG. 3 is a conceptual diagram for explaining the voltage boosting function of the voltage converter unit 30. FIG. 3 shows the switching element S2 and the diode D1 used to actualize the power supply function of supplying power to the electrical load LM. The switching element S1 and the diode D2 used to actualize the regeneration function and the drive circuit 22 are omitted. According to the embodiment, only the power supply function is described. Description is omitted regarding the regeneration function in which effects according to the embodiment can be achieved in a manner similar to the power supply function. In actuality, the control section 20 does not select which of the power supply function and the regeneration function is realized. As shown in FIG. 1, the control section 20 merely performs complementary drive for alternately turning ON the switching elements S1 and S2. Through this operation, the power supply function is realized in a state in which a current flows to the switching element S2 during the ON-period of the switching element S2. Conversely, the regeneration function is realized in a state in which a current flows to the switching element S1 during the ON-period of the switching element S1. A known dead-time period DT is provided between the ON-period of the switching element S1 and the ON-period of the switching element S2 to prevent a state in which both switching elements S1 and S2 are ON.

Figures 4, 5:
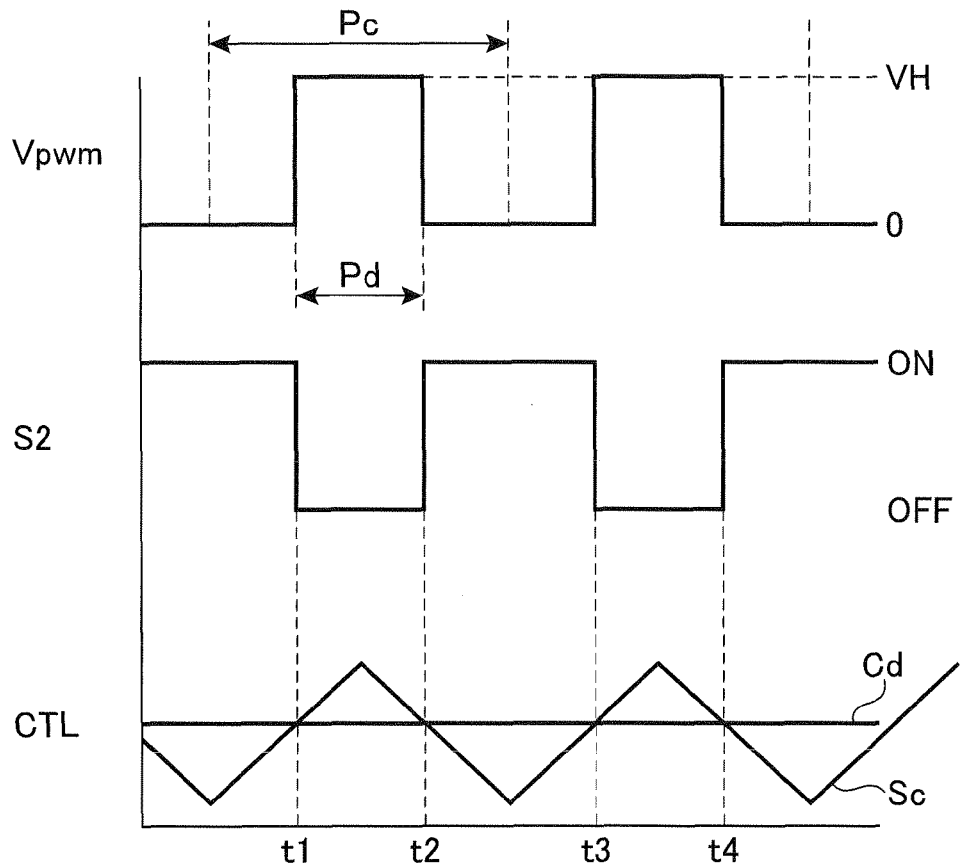
FIG. 4 is a time chart of operation details of the voltage converter unit 30.
FIG. 5 is calculation formulas expressing resonance characteristics of a voltage converter 10.

FIG. 4 is a time chart of operation details of the voltage converter unit 30. Vpwm indicates the value of potential Vpwm of a node N (see FIG. 3) when the input-side terminal T2 and the output-side terminal T4 are the reference potential (zero voltage potential). S2 indicates the ON/OFF state of the switching element S2. CTL indicates the operation details of the command section 23 that outputs commands to the drive circuit 21 to drive the switching element S2 ON and OFF.

When the switching element S2 is ON, the node N is short-circuited on the output-side terminal T4 (input-side terminal T2) side. Therefore, the potential Vpwm of the node N is a zero volt potential. In this state, the voltage of the DC battery VB is applied to the reactor 35 and charging of the reactor 35 is started. When the switching element S2 is turned OFF in this state, the reactor 35 generates voltage by the energy with which the reactor 35 has been charged. The reactor 35 generates a high potential VH as a result of the generated voltage being added with the voltage of the DC battery VB. As a result, the current can pass through the diode D1, thereby supplying power to the electrical load LM and charging the smoothing capacitor C1.

The command section 23 outputs PWM signals (ON/OFF commands) to the drive circuit 21 that drives the switching element S2. The ON/OFF command is generated by a carrier signal Sc and a duty command value Cd. The carrier signal Sc is a triangular wave outputted at a constant cycle Pc. The duty command value Cd is a signal voltage used to determine the proportion of a period Pd over which the switching element S2 is OFF in each cycle Pc.

The cycle Pc is an inverse number of the switching frequency fc of the switching elements S1 and S2. Here, according to the embodiment, the switching frequency fc is a higher frequency than the switching frequency fin of the inverter INV. In comparison particularly with the value fin1 of the switching frequency fin in the low-rotation range in which the generated torque of the motor-generator MG may reach maximum, the switching frequency fc is a high frequency that is 10 times the value fin1 or higher. According to the embodiment, a value that is the switching frequency fc of the switching elements S1 and S2 multiplied by the number of voltage converter units (i.e., the number of reactors) is set to exceed audible frequency range (20 Hz to 16 kHz).

Specifically, the value fin1 of the switching frequency fin in the low-rotation range is set to 1 kHz. The switching frequency fc is set to 10 kHz. In this instance, two voltage converter units 30 and 30a (two reactors 35 and 35a) are included according to the embodiment. Therefore, the frequency obtained by the switching frequency fc being multiplied by two is 20 kHz, exceeding the audible frequency range. A ripple current of 20 kHz flows to the smoothing capacitor and the DC battery VB. The purpose of this setting is to suppress magnetic noise sensed by humans, while reducing the amount of heat generated per unit time by each switching element. According to the embodiment, the switching elements handle high-voltage large currents. Therefore, setting the switching frequency fc to a frequency exceeding audible frequency range causes an expansion of the chip area of the switching elements and an enlargement of a cooler used to cool the switching elements. Thus, application to vehicles is unrealistic.

The command section 23 has a comparator (not shown). The command section 23 outputs ON/OFF commands such that the switching element S2 is turned OFF when the potential of the triangular wave is greater than the duty command value Cd (such as during time t1 to t2 and time t3 to t4) and turned ON when the potential of the triangular wave is less than the duty command value Cd (such as during time t2 to t3). The command section 23 can manipulate duty ratio D by increasing or decreasing the duty command value Cd as the potential. The duty ratio D indicates the percentage of the period Pd over which power is supplied to the electrical load LM (the switching element S2 is OFF) in relation to each cycle Pc, and is the inverse number of the boost ratio.

FIG. 5 shows calculation formulas expressing the resonance characteristics of the voltage converter 10. The two calculation formulas F1 and F2 are derived based on an equation of state generated by weighted-average processing being performed on a pair of equations using the durations (Pc-Pd) and Pd of the states of the pair of equations. The pair of equations are: a circuit equation of when the switching element S2 is turned ON, and a circuit equation of when the switching element S2 is turned OFF. The calculation formula F1 is used to calculate the resonant frequency fLC of the voltage converter 10. The calculation formula F2 is used to calculate a damping ratio of the voltage converter 10.

The resonant frequency fLC and the damping ratio of the voltage converter 10 are closely related with the occurrence of a resonance phenomenon caused by periodic fluctuations in the voltage of the electrical load LM. In other words, the resonant frequency fLC is preferably sufficiently separated from the frequency of the periodic fluctuation (primary fluctuation) in the voltage of the electrical load LM. On the other hand, the damping ratio is preferably sufficiently large.

However, reduced internal resistance RB in the DC battery VB is desired to improve performance of the power supply device 50. Therefore, in general, the damping ratio tends to decrease in accompaniment with the reduction in internal resistance RB. On the other hand, the reactor 35 is preferably made larger to enhance charge and discharge functions from the perspective of power boost in the power supply device 50. Therefore, the resonant frequency fLC and the damping ratio both tend to decrease as a result of increase in inductance.

Figure 6A:
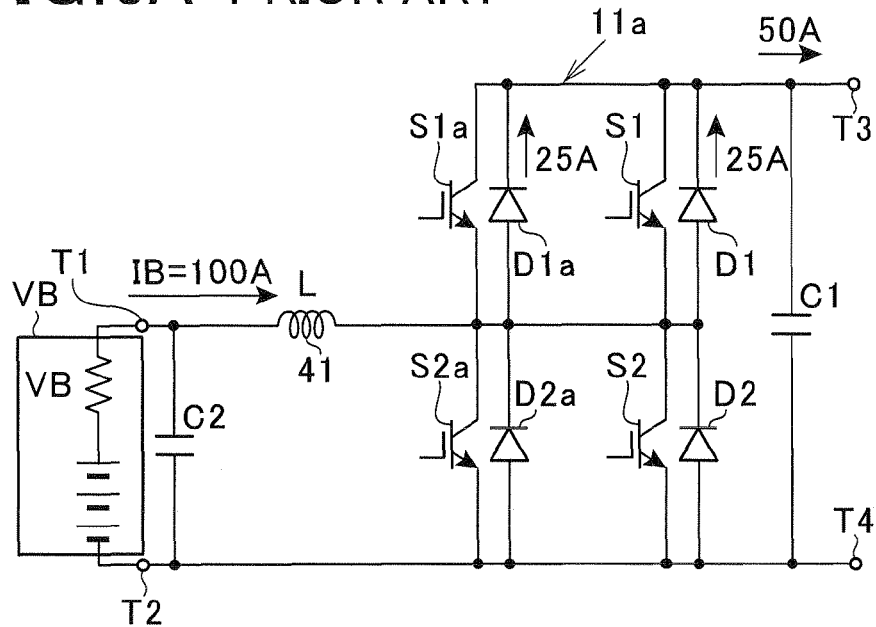
FIG. 6A and FIG. 6B are explanatory diagrams of examples of specification changes for power boost in comparison examples.
Figure 6B:
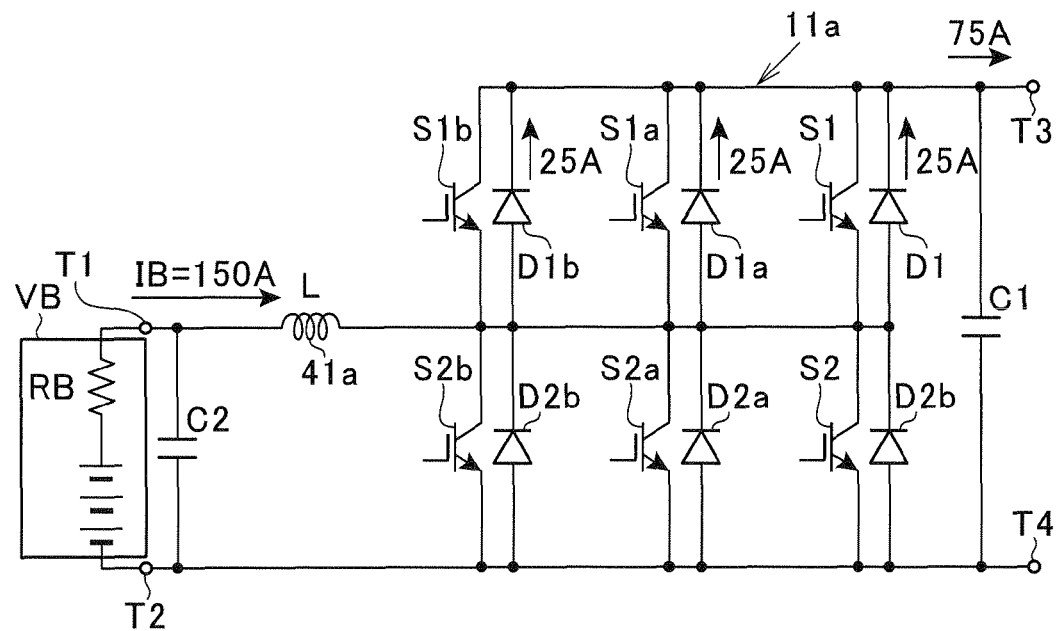

FIG. 6A and FIG. 6B are explanatory diagrams of examples of specification changes for power boost in comparison examples. The comparison examples are given to better describe the characteristics of the embodiment. FIG. 6A and FIG. 6B show two voltage converters 11 and 11a of the comparison examples. An example is shown in which the voltage converters 11 and 11a convert a voltage of 300V of the DC battery VB (between the input-side terminals T1 to T2) to 600V between the output-side terminals T3 to T4.

First, the voltage converter 11 includes a reactor 41, four diodes D1, D1a, D2, and D2a, and four switching elements S1, S1a, S2, and S2a. The reactor 41 has an inductance L that is twice that of the reactor 35.

One end of the reactor 41 is connected to the input-side terminal T1 of the voltage converter 11. The other end of the reactor 41 is connected to the emitters of the two switching elements S1 and S1a, the collectors of the two switching elements S2 and S2a, the anodes of the two diodes D1 and D1a, and the cathodes of the two diodes D2 and D2a. The two switching elements S1 and S1a, the two switching elements S2 and S2a, the two diodes D1 and D1a, and the two diodes D2 and D2a are connected in parallel to meet the rated current capacity (IB=100 A in FIG. 6A) and are driven simultaneously.

When the two switching elements S2 and S2a are ON, 300V is applied to the reactor 41 as the voltage of the DC battery VB (between the input-side terminals T1 to T2). A sawtooth wave-shaped current that increases in relation to elapsed time, passing the current value IB (100 A) at the center, flows to the reactor 41. In addition, the ON/OFF commands for the two switching elements S2 and S2a are generated based on the carrier signal and the duty command value D (D=50% in the comparison example) of a command section (not shown). When the two switching elements S2 and S2a simultaneously switch from ON to OFF based on the ON/OFF command, a sawtooth wave-shaped current that decreases in relation to elapsed time, passing the current value IB (100 A) at the center, flows to the reactor 41. The reactor 41 discharges the energy with which the reactor 41 has been charged and boosts the voltage. The current is divided and averaged such that a current of 25 A flows through each of the two diodes D1 and D1a. As a result, 600V can be obtained as the voltage between the output-side terminals T3 to T4.

Next, the comparison example in FIG. 6B will be described. In a manner similar to FIG. 6A, FIG. 6B also shows an example in which the voltage converter 11a converts a voltage of 300V of the DC battery VB (between the input-side terminals T1 to T2) to 600V between the output-side terminals T3 to T4.

Changes have been made for the configuration of the voltage converter 11a to increase the output power of the voltage converter 11 by 1.5 times. To meet the rated current capacity (IB=150 A in FIG. 6B) that has increased by 1.5 times, switching elements S1b and S2b and diodes D1b and D2b are further connected in parallel in the voltage converter 11a. As a result of the switching elements S1b and S2b and the diodes D1b and D2b being added, in the instance of duty command value D (D=50% in the present comparison example), the current is divided and averaged such that a current of 25 A, equivalent to that of the voltage converter 11, can be sent to each diode. However, the reactor 41a has the same inductance L as the reactor 41. Thermal design for meeting a current capacity that is 1.5 times that of the reactor 41 is required. As a result, the reactor 41a becomes larger than the reactor 41 by 1.5 times, as described hereafter.

A winding resistance RL (not shown) is present in the reactor 41a. Therefore, when the current is increases by 1.5 times, copper loss (RL×IB2) increases by 2.25 (1.5 squared) times. As a result, the thermal design of the reactor 41a includes heat-discharge capability that is 2.25 times that of the reactor 41 or an alternate function (specifically the addition of a cooler or the like) equivalent to the heat-discharge capability.

Figure 7A:
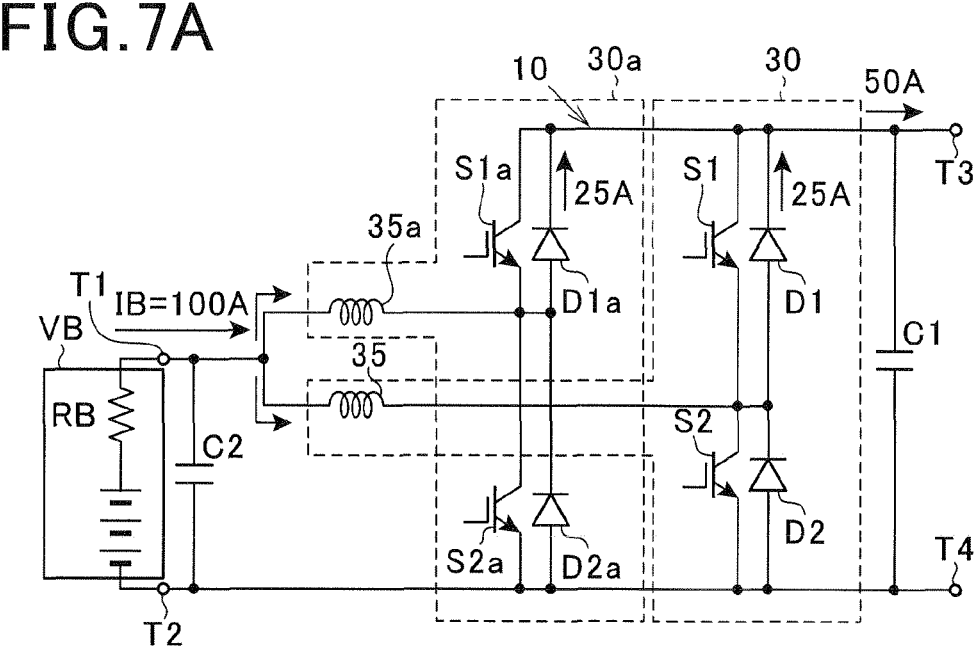
FIG. 7A and FIG. 7B are explanatory diagrams of examples of specification changes for power boost according to the embodiment.
Figure 7B:
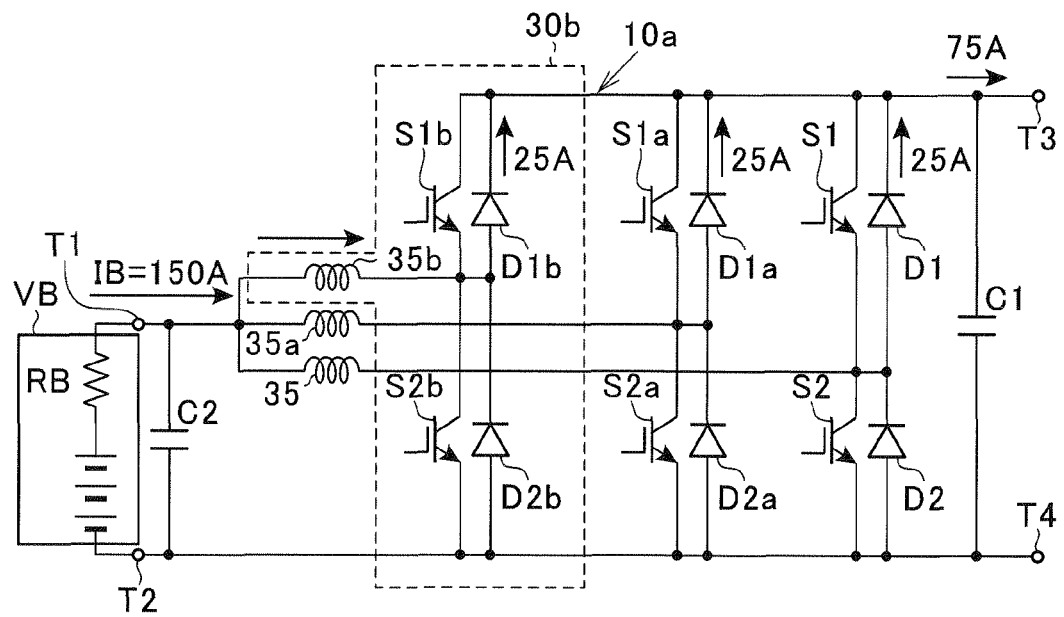

FIG. 7A and FIG. 7B are explanatory diagrams of examples of specification changes for power boost according to the embodiment. FIG. 7A and FIG. 7B show two voltage converters 10 and 10a according to the embodiment. The voltage converter 10 is the same as the circuit shown in FIG. 1. Changes have been made for the configuration of the voltage converter 10a to increase the output power of the voltage converter 10 by 1.5 times. Specifically, an example is shown in which the voltage converter 10 or 10a converts a voltage of 300V of the DC battery VB (between the input-side terminals T1 to T2) to 600V between the output-side terminals T3 to T4.

The voltage converter 10 differs from the voltage converter 11 of the comparison example regarding the following two points. A first difference is that the inductances of the reactors 35 and 35a are provided in parallel. The current (IB=100 A) flowing to the reactors 35 and 35a is half (50 A) of that of the reactor 41 and copper loss can be reduced by 0.25 (0.5 squared) times. Therefore, the thermal design has leeway. As a result, although two reactors 35 and 35a are provided, size can be reduced from that of the reactor 41. A second difference is that the switching elements S1 and S2 are only connected to the reactor 35a, and the switching elements S1a and S2a are only connected to the reactor 35a. As a result, the voltage converter 10 can drive the reactors 35 and 35a independently from each other, such as to charge and discharge the reactors at differing timings (phases).

When one switching element S2 is ON, the voltage of the DC battery VB (between the input-side terminals T1 to T2) is applied to the reactor 35. A sawtooth wave-shaped current that increases in relation to elapsed time, passing the current value IB (50 A) at the center, flows to the reactor 35.

When the one switching element S2 switches from ON to OFF, a sawtooth wave-shaped current that decreases in relation to elapsed time, passing the current value IB (50 A) at the center, flows to the reactor 35. The reactor 35 discharges the energy with which the reactor 35 has been charged and boosts the voltage. In the instance of duty command value D (D=50% in the present comparison example), a current having a current value (25 A) flows to the diode D1.

As shown in FIG. 7A, current flows to each of the reactor 35, the switching element S2, and the diode D1 such that the power of the voltage converter unit 30 is equivalent to the power of the DC battery VB. This similarly applies to the voltage converter unit 30a.

In addition, in the voltage converter 10, the voltage converter unit 30a that can be driven independently from the voltage converter unit 30 is connected in parallel with the voltage converter unit 30. Therefore, the voltage converter 10 can output the same power as that of the voltage converter 11 of the comparison example by driving both of the two voltage converter units 30 and 30a.

In the voltage converter 10 of the example, the number of reactors having the same inductance is increased in accompaniment with the increase in required power. As a result, the combined inductance of the reactors can be sufficiently reduced. In other words, the combined inductance of, for example, the two reactors 35 and 35a can be reduced to half (L/2) the inductance of the single reactor 41. As a result, the voltage converter 10 actualizes a resonant frequency fLC and a damping ratio ζ that is the square root of 2 times higher than those of the voltage converter 11 of the comparison example (refer to formulas F1 and F2 in FIG. 5).

Next, the specification changes made to the voltage converter 10 in the example shown in FIG. 7B will be described. In a manner similar to FIG. 7A, FIG. 7B also shows an instance in which a voltage of 300V of the DC battery VB (between the input-side terminals T1 to T2) is converted to 600V between the output-side terminals T3 to T4. In addition, FIG. 7B also shows an instance in which the duty command value D is 50%. Furthermore, changes have been made for the configuration of the voltage converter 10a of the example to increase the output power of the voltage converter 10 by 1.5 times. In addition, IB=150 A. In the voltage converter 10a, to actualize the output that has increased by 1.5 times, a voltage converter unit 30b including a reactor 35b is connected in parallel with the voltage converter units 30 and 30a. The three voltage converter units 30, 30a, and 30b can be driven at phases differing from one another.

As described above, the specification changes of the voltage converter 10 according to the embodiment can be achieved simply by the voltage converter unit 30b including the reactor 35b being added. On the other hand, the specification changes of the voltage converter 11 of the comparison example require redesigning of the reactor in terms of the current allowable value and the thermal design of the reactor 41, to meet the current capacity that has increased by 1.5 times.

In the thermal design of the reactor, design flexibility in which the shape of the wire of the coil is thickened to reduce copper loss that causes heat generation and design flexibility in which the surface area is increased to enhance heat-discharging effects are generally used. However, regardless of which design flexibility is used, an area in which volume nonlinearly (suddenly) increases is present in designing the reactor, hampering power boost of the power supply device 50.

As described above, the voltage converter 10 according to the embodiment is configured to obtain a resonant frequency fLC and a damping ratio ζ that are higher than those of the voltage converter 11 of the comparison example. In addition, the voltage converter 10 is configured to be capable of easily and flexibly respond to specification changes. Moreover, excessive enlargement of the reactor can be avoided, and dispersed placement of the reactors 35, 35a, and 35b is possible. Thermal design and packaging design of vehicles can be facilitated.

Figure 8:
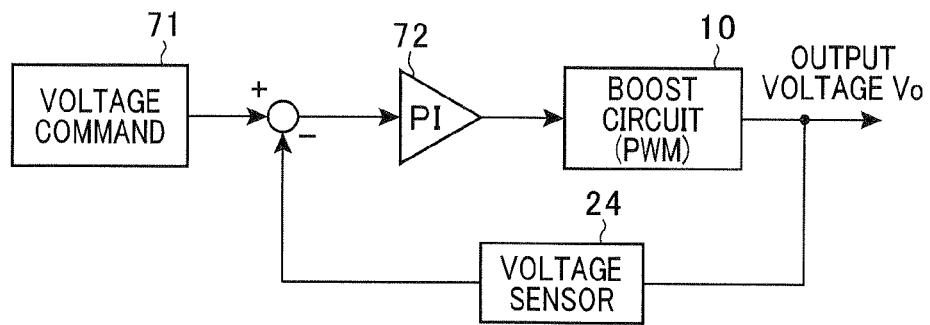
FIG. 8 is a control block diagram in which a voltage converter 10a is controlled.

FIG. 8 is a control block diagram in which the voltage converter 10a is controlled. The control section 20 (see FIG. 1) has a voltage command section 71 and a proportional-integral (PI) controller 72 in the command section 23. The control section 20 performs feedback control using the voltage values measured by the voltage sensor 34 (see FIG. 1).

The voltage command section 71 calculates a voltage suitable for the operating state of the motor-generator MG as a boost voltage command. The above-described example in which the voltage of 300V of the DC battery VB (between the input-side terminals T1 to T2) is converted to 600V between the output-side terminals T3 to T4 is a description of a state in which voltage conversion is stable when the boost voltage command is 600V.

Figure 9:
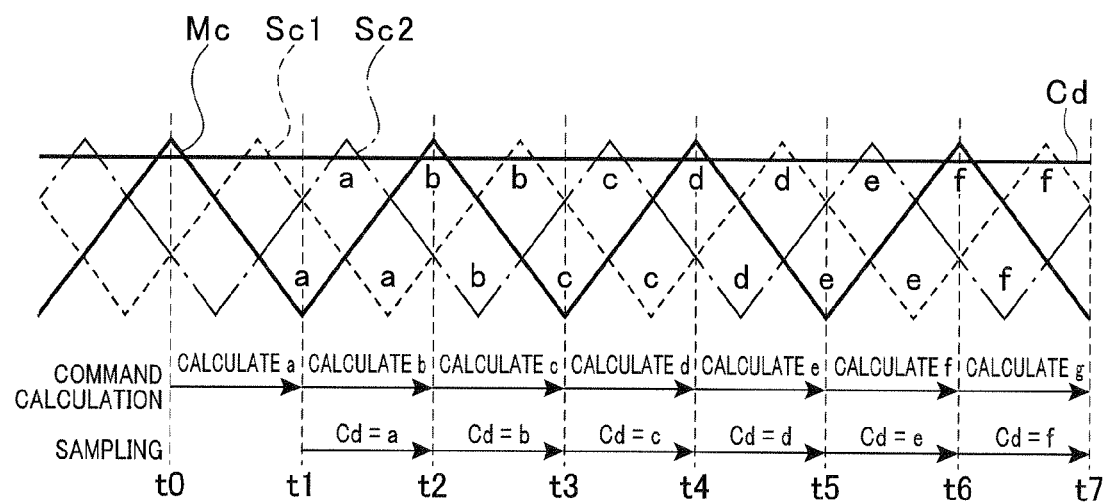

FIG. 9 is a time chart of control details of the voltage converter 10a. The command section 23 controls the three voltage converter units 30, 30a, and 30b such that respective phases are shifted from one another. Specifically, the three voltage converter units 30, 30a, and 30b are driven using three carrier signals Mc, Sc1, and Sc2 of which the respective phases are shifted from one another. The carrier signal Mc is a master carrier signal serving as reference. The two carrier signals Sc1 and Sc2 have the same waveform (triangular wave) as the master carrier signal Mc. However, the phases of the two carrier signals Sc1 and Sc2 are shifted from that of the carrier signal Mc.

Specifically, the command section 23 calculates the duty command value Cd for each half-wave (such as time t0 to t1) of the triangular waves of the master carrier signal Mc, and updates the output value of the duty command value Cd. More specifically, at the peak time t0 of a triangular wave of the master carrier signal Mc, the command section 23 acquires (samples) output from the voltage sensor 24 and starts calculation of the duty command value Cd. The command section 23 completes the calculation of the duty command value Cd by the bottom time t1 of the triangular wave and acquires a calculated value a. The command section 23 changes (updates) the output value of the duty command value Cd to the calculated value a and restarts the calculation of the duty command value Cd at the bottom time t1 of the triangular wave.

The command section 23 can use the duty command value Cd for the other two carrier signals Sc1 and Sc2. Therefore, the command section 23 can control the three voltage converter units 30, 30a, and 30b with a simple configuration. As a result, the three voltage converter units 30, 30a, and 30b can output equal power.

In addition, exacerbation of magnetic noise generated particularly by the DC battery VB can be suppressed. Because the voltage converter units 30, 30a, and 30b can output equal power, a current including ripple can be uniformly sent. Therefore, equal ripple currents of a frequency three times that of the master carrier signal MC flows to the smoothing capacitor and the DC battery VB. Magnetic noise is exacerbated particularly in electric automobiles and plug-in hybrid automobiles required to travel long distances using only power from the DC battery VB, because IB is increased in accompaniment with the increase in output. The sound pressure of the magnetic noise increases as the absolute value of charge and discharge current increases, even when the ripples are equal. The charge and discharge current is the sum of the ripple and the IB of the DC battery VB. The switching frequency of the voltage converter units 30, 30a, and 30b exceeds the audible frequency range when the number of converter units i.e., three is multiplied. Because the switching frequency is set within the audible frequency range, the magnetic noise may be heard by passengers as uncomfortable sounds unless the power of the voltage converter units 30, 30a, 30b are equal.

As described above, rather than being configured to control a single converter unit 30, the command section 23 is capable of controlling three voltage converter units 30, 30a, and 30b simply by generating the two carrier signals Sc1 and Sc2 of which the phases have been shifted.

Other Embodiments

The present application is not limited to the above-described embodiment and may be achieved, for example, as follows.

(a) According to the above-described embodiment, the voltage converter is described as including a boost circuit and a regeneration circuit. However, the voltage converter may include only the boost circuit.

(2) According to the above-described embodiment, an example is given of a voltage converter configured by voltage converter units, each including a reactor, switching elements, and diodes, being connected in parallel. However, only N reactors, for example, may be connected in parallel.

(3) Furthermore, the reactor included by each of the plurality of voltage converter units included in the voltage converter of the example may be configured by a plurality of reactors connected in parallel.

(4) In the above-described example, all of the plurality of voltage converter units have the same configuration. However, voltage converter units having differing capacities may be included. In this instance, detailed design can be actualized through use of the voltage converter units having differing capacities. Specifically, for example, when a 50 kw voltage converter unit and a 25 kw voltage converter unit can be used, design using 25 kw units can be actualized through combination of the voltage converter units. In this instance, the 50 kw voltage converter unit can be driven during normal operation, and the 25 kw voltage converter unit can be additionally driven in operating ranges where resonance should be suppressed.

(5) In the above-described example, all of the plurality of voltage converter units are driven. However, a configuration is possible in which some of the voltage converter units are stopped when the output power is small. In this instance, reduction in the efficiency of the voltage converter when the output power is excessively small can be prevented.

(6) In the above-described example, the reactor is connected to the positive terminal side of the direct-current battery. However, for example, the reactor may be connected to the negative terminal side of the direct-current battery. The diodes and the switching elements may be connected with the respective polarities reversed. In the present application, all that is required is that the respective polarities of the elements are connected to one another in a direction configuring a charge circuit (first circuit) and a discharge circuit (second circuit). The charge circuit is connected such that the direct-current power supply charges the reactor when the switching element is turned ON. The discharge circuit is connected such that the reactor discharges power to the electrical load when the switching element is turned OFF.

(7) In the above-described example, the electrical load is a drive device (alternating-current motor and inverter) of a vehicle. However, this is not limited thereto, and other types of electrical load are also applicable.

What is claimed is:

1. A voltage converter that converts a voltage of DC power supplied by a power source and applies an electrical load with a converted voltage, comprising:
    a first circuit including N, where N being an integer of 2 or more, reactors mutually connected in parallel with respect to the power source, and at least one switching element, wherein one ends of the reactors are connected to the power source and tied each other, and each of the other ends of the reactors is connected to the at least one switching element; and
    a second circuit including at least one rectifier of which one end is connected to the electrical load and the other end is connected to the at least one switching element which is shared with the first circuit,
    wherein the first circuit is configured to allow the reactors to be charged with the DC power supplied by the power source when the switching element turns ON, and the second circuit is configured to allow the reactors to be discharged to supply the electrical load with the DC power when the switching element turns OFF, and
    the N switching elements constitute the switching element, a switching frequency of each switching element in the N switching element is within an audible frequency range, and a frequency value where the switching frequency of the switching element included in the voltage converter is multiplied by the number of reactors connected in parallel is set to exceed the audible frequency range.

2. The voltage converter according to claim 1, wherein the N rectifiers constitute the rectifier, the first circuit is configured to allow the respective reactors connected to each of the N switching elements to be supplied with the DC power from the power source when each of the N switching elements turns ON, and the second circuit is configured to allow the respective reactors connected to each of the N switching elements to supply the electrical load with the DC power when each of the N switching element turns OFF.

3. The voltage converter according to claim 2, wherein
the first circuit includes N switching elements and N rectifiers connected in parallel each other, and
the second circuit includes N rectifiers and N switching elements connected in parallel each other;
a dead time is set between the N switching elements included in the first circuit and the N switching elements included in the second circuit;
the N switching elements included in the second circuit are turned OFF while the N switching elements included in the first circuit are turned ON and the N switching elements included in the second circuit are turned ON while the N switching elements included in the first circuit are turned OFF, thereby supplying the DC power to the electrical load from the power source and supplying a power to the power source from the electrical load.

4. The voltage converter according to claim 2, wherein the voltage converter is controlled by a control section that drives the N switching elements at differing phases, the voltage converter and the control section constitutes a voltage converter system.

5. The voltage converter according to claim 3, wherein the voltage converter is controlled by a control section that drives the N switching elements at differing phases, the voltage converter and the control section constitutes a voltage converter system.

6. The voltage converter system according claim 4, wherein the electrical load is an alternating-current motor system including a traction motor of a vehicle and a direct current-to-alternating current converter circuit for driving the traction motor.

7. A voltage converter that converts a voltage of DC power supplied by a power source and applies an electrical load with a converted voltage, comprising:
N voltage converter units, where N being an integer of 2 or more, mutually connected in parallel between the power source and the electrical load,
wherein each of the voltage converter units includes a first circuit having a reactor of which one end is connected to the power source and a switching element connected to the other end of the reactor, and a second circuit having a rectifier of which one end is connected to the electrical load and the switching element shared with the first circuit, the switching element being connected to the other end of the rectifier,
the first circuit is configured to allow the reactor to be charged with the DC power supplied by the power source when the switching element turns ON, and the second circuit is configured to allow the reactors to be discharged to supply the electrical load with the DC power when the switching element turns OFF, and
a switching frequency of the switching element included in the voltage converter is within an audible frequency range, and a frequency value where the switching frequency of the switching element included in the voltage converter is multiplied by the number of voltage converters is set to exceed the audible frequency range.

8. The voltage converter according to claim 7, wherein
the first circuit in each of the voltage converter unit includes a rectifier connected in parallel to the switching element, and the second circuit in each of the voltage converter unit includes a rectifier connected in parallel to the switching element,
a dead time is set between the switching element included in the first circuit and the switching element included in the second circuit,
the switching element included in the second circuit is turned OFF while the switching element included in the first circuit is turned ON and the switching element included in the second circuit is turned ON while the switching element included in the first circuit is turned OFF, thereby supplying the DC power to the electrical load from the power source and supplying a power to the power source from the electrical load.

9. The voltage converter according to claim 7, wherein the voltage converter is controlled by a control section that drives the N switching elements at differing phases, the voltage converter and the control section constitutes a voltage converter system.

10. The voltage converter according to claim 8, wherein the voltage converter is controlled by a control section that drives the N switching elements at differing phases, the voltage converter and the control section constitutes a voltage converter system.

11. A voltage converter that converts a voltage of DC power supplied by a lithium ion battery and applies an electrical load including AC motor with a converted voltage, comprising:
a first circuit including N, where N being an integer of 2 or more, reactors mutually connected in parallel with respect to the lithium ion battery, and at least one switching element being on-off controlled with a predetermined duty ratio, wherein one ends of the reactors are connected to the lithium ion battery and tied each other, and each of the other ends of the reactors is connected to the at least one switching element; and
a second circuit including at least one rectifier of which one end is connected to the electrical load and the other end is connected to the at least one switching element which is shared with the first circuit, wherein:
the first circuit is configured to allow the reactors to be charged with the DC power supplied by the lithium ion battery when the switching element turns ON, and the second circuit is configured to allow the reactors to be discharged to supply the electrical load and a smoothing capacitor connected in parallel with the electrical load, with the DC power when the switching element turns OFF;
the N switching elements constitute the switching element, a switching frequency of each switching element in the N switching element is within an audible frequency range, and a frequency value where the switching frequency of the switching element included in the voltage converter is multiplied by the number of reactors connected in parallel is set to exceed the audible frequency range;
a resonance frequency calculated by inductance of one of the N reactors, capacitance of the smoothing capacitor and the predetermined duty ratio is within a frequency range of a voltage fluctuation of the electrical load caused by the AC motor; and
a resonance frequency calculated by combined inductance of the N reactors, the capacitance of the smoothing capacitor and the predetermined duty ratio is out of the frequency range of a voltage fluctuation of the electrical load caused by the AC motor.

* * * * *